(12) United States Patent
Ramadan et al.

(10) Patent No.: US 12,432,670 B2
(45) Date of Patent: Sep. 30, 2025

(54) TRANSMIT POWER LIMIT BASED ON SENSOR SPATIAL COVERAGE

(71) Applicant: QUALCOMM Incorporated, San Diego, CA (US)

(72) Inventors: Yahia Ramadan, San Jose, CA (US); Farhad Meshkati, San Diego, CA (US); Raghu Narayan Challa, San Diego, CA (US); Jagadish Nadakuduti, Bermuda Dunes, CA (US); Lin Lu, San Diego, CA (US); Roberto Rimini, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 541 days.

(21) Appl. No.: 18/046,247

(22) Filed: Oct. 13, 2022

(65) Prior Publication Data

US 2023/0120500 A1 Apr. 20, 2023

Related U.S. Application Data

(60) Provisional application No. 63/256,313, filed on Oct. 15, 2021.

(51) Int. Cl.
*H04W 52/24* (2009.01)
*H04W 52/36* (2009.01)
*H04W 52/14* (2009.01)

(52) U.S. Cl.
CPC ....... *H04W 52/245* (2013.01); *H04W 52/367* (2013.01); *H04W 52/143* (2013.01)

(58) Field of Classification Search
CPC ............. H04W 52/245; H04W 52/246; H04W 52/247; H04W 52/367; H04W 52/36; H04W 52/143; H04W 52/14
See application file for complete search history.

(56) References Cited

U.S. PATENT DOCUMENTS 9,603,105 B2 * 3/2017 Yun ........................ H04W 52/52
2020/0267662 A1 8/2020 Godala et al.

OTHER PUBLICATIONS

WO 2020101757 A1), Shi et al., Method and Apparatus for Determining Dynamic Beam Correspondence for Phased Array Antenna, May 2020, pp. 1-38 (Year: 2020).*
International Search Report and Written Opinion—PCT/US2022/078088—ISA/EPO—Jan. 25, 2023.

* cited by examiner

*Primary Examiner* — Keith Ferguson
(74) *Attorney, Agent, or Firm* — Patterson & Sheridan, L.L.P/Qualcomm Incorporated

(57) ABSTRACT

Techniques and apparatus for determining a transmit power limit based on sensor spatial coverage. A method that may be performed by a wireless communication device includes selecting a beam for transmission of a signal, determining a transmit power limit based at least in part on an overlap between the selected beam and a coverage zone of a sensor, and transmitting the signal via the beam at a transmit power based at least in part on the determined transmit power limit.

26 Claims, 7 Drawing Sheets

TRANSMIT POWER LIMIT BASED ON SENSOR SPATIAL COVERAGE

CROSS-REFERENCE TO RELATED APPLICATION

The present Application for Patent claims benefit of U.S. Provisional Application No. 63/256,313, filed Oct. 15, 2021, which is hereby expressly incorporated by reference herein in its entirety.

BACKGROUND

Field of the Disclosure

Aspects of the present disclosure relate to wireless communications, and more particularly, to techniques for transmitting in compliance with certain radio frequency exposure limits.

Description of Related Art

Wireless communication systems are widely deployed to provide various telecommunication services such as telephony, video, data, messaging, broadcasts, etc. Modern wireless communication devices (such as cellular telephones) are generally required to meet radio frequency (RF) exposure limits set by domestic and international standards and regulations. To ensure compliance with the standards, such devices currently undergo an extensive certification process prior to being shipped to market. To ensure that a wireless communication device complies with an RF exposure limit, techniques have been developed to enable the wireless communication device to assess RF exposure from the wireless communication device and adjust the transmission power of the wireless communication device accordingly to comply with the RF exposure limit.

SUMMARY

The systems, methods, and devices of the disclosure each have several aspects, no single one of which is solely responsible for its desirable attributes. After considering this discussion, and particularly after reading the section entitled "Detailed Description" one will understand how the features of this disclosure provide advantages that include desirable transmit powers in compliance with radio frequency (RF) exposure limits.

Certain aspects of the subject matter described in this disclosure can be implemented in a method for wireless communication, for example, by a wireless communication device. The method generally includes selecting a beam for transmission of a signal; determining a transmit power limit based at least in part on a comparison between a first array gain for the beam inside a coverage zone of a sensor and a second array gain for the beam outside the coverage zone of the sensor; and transmitting the signal via the beam at a transmit power based at least in part on the determined transmit power limit.

Certain aspects of the subject matter described in this disclosure can be implemented in a method for wireless communication, for example, by a wireless communication device. The method generally includes selecting a beam for transmission of a signal; determining a transmit power limit based at least in part on a minimum between: a first ratio based on a maximum distance of a coverage zone of a sensor and a specified distance for a radio frequency (RF) exposure limit, and a second ratio based on a maximum array gain for the beam and an array gain for the beam outside the coverage zone; and transmitting the signal via the beam at a transmit power based at least in part on the determined transmit power limit.

Certain aspects of the subject matter described in this disclosure can be implemented in an apparatus for wireless communication. The apparatus generally includes a memory and a processor, which is coupled to the memory. The processor and the memory are configured to select a beam for transmission of a signal, determine a transmit power limit based at least in part on a comparison between a first array gain for the beam inside a coverage zone of a sensor and a second array gain for the beam outside the coverage zone of the sensor, and transmit the signal via the beam at a transmit power based at least in part on the determined transmit power limit.

Certain aspects of the subject matter described in this disclosure can be implemented in an apparatus for wireless communication. The apparatus generally includes a memory and a processor, which is coupled to the memory. The processor and the memory are configured to: select a beam for transmission of a signal; determine a transmit power limit based at least in part on a minimum between: a first ratio based on a maximum distance of a coverage zone of a sensor and a specified distance for a radio frequency (RF) exposure limit, and a second ratio based on a maximum array gain for the beam and an array gain for the beam outside the coverage zone; and transmit the signal via the beam at a transmit power based at least in part on the determined transmit power limit.

Certain aspects of the subject matter described in this disclosure can be implemented in an apparatus for wireless communication. The apparatus generally includes means for selecting a beam for transmission of a signal; means for determining a transmit power limit based at least in part on a comparison between a first array gain for the beam inside a coverage zone of a sensor and a second array gain for the beam outside the coverage zone of the sensor; and means for transmitting the signal via the beam at a transmit power based at least in part on the determined transmit power limit.

Certain aspects of the subject matter described in this disclosure can be implemented in an apparatus for wireless communication. The apparatus generally includes means for selecting a beam for transmission of a signal; means for determining a transmit power limit based at least in part on a minimum between: a first ratio based on a maximum distance of a coverage zone of a sensor and a specified distance for a radio frequency (RF) exposure limit, and a second ratio based on a maximum array gain for the beam and an array gain for the beam outside the coverage zone; and means for transmitting the signal via the beam at a transmit power based at least in part on the determined transmit power limit.

Certain aspects of the subject matter described in this disclosure can be implemented in a computer-readable medium. The computer-readable medium has instructions stored thereon for selecting a beam for transmission of a signal; determining a transmit power limit based at least in part on a comparison between a first array gain for the beam inside a coverage zone of a sensor and a second array gain for the beam outside the coverage zone of the sensor; and transmitting the signal via the beam at a transmit power based at least in part on the determined transmit power limit.

Certain aspects of the subject matter described in this disclosure can be implemented in a computer-readable medium. The computer-readable medium has instructions stored thereon for selecting a beam for transmission of a signal; determining a transmit power limit based at least in part on a minimum between: a first ratio based on a maximum distance of a coverage zone of a sensor and a specified distance for a radio frequency (RF) exposure limit, and a second ratio based on a maximum array gain for the beam and an array gain for the beam outside the coverage zone; and transmitting the signal via the beam at a transmit power based at least in part on the determined transmit power limit.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain aspects of this disclosure and the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
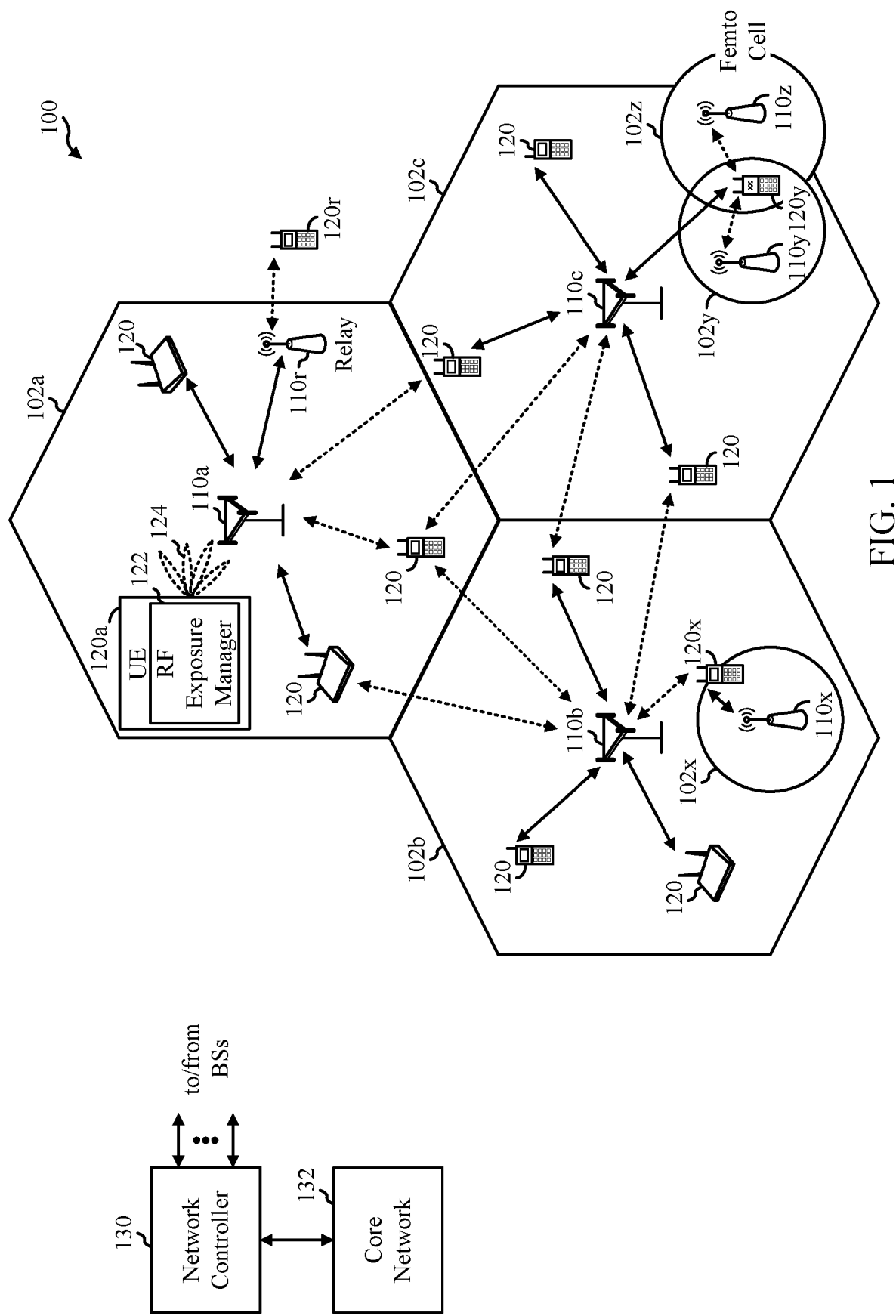
FIG. 1 is a block diagram conceptually illustrating an example wireless communication network, in accordance with certain aspects of the present disclosure.

Aspects of the present disclosure provide apparatus, methods, processing systems, and computer-readable mediums for determining a transmit power limit based on sensor spatial coverage. In certain cases, a beam for transmission may overlap with a coverage zone of a sensor used to detect whether human tissue is in proximity to a wireless device, and the wireless device may not account for certain blind spots of the sensor in terms of radio frequency exposure, which may result in overexposure of human tissue to certain radio frequencies.

A wireless device may consider the radio exposure level of a transmission within and outside the sensor coverage in determining the transmit power limit, for example, when the wireless device detects that no human tissue is in the sensor coverage. Within the sensor coverage, the transmit power limit may be at or below an RF exposure limit for the maximum distance of the sensor coverage. Outside the sensor coverage, the transmit power limit may be at or below an RF exposure limit for a specified distance (e.g., 20 centimeters) based on the assumption that human tissue may be located within the specified distance in the blind spot of the sensor. In certain aspects, the wireless device may apply a constraint for determining a transmit power limit that selects a minimum between certain factors indicative of the RF exposure limits for inside and outside the sensor coverage, as further described herein. The techniques for determining the transmit power limit may provide desirable uplink communication performance (e.g., higher uplink throughput, reduced latencies, and/or desirable cell coverage) in compliance with RF exposure limits.

The following description provides examples of RF exposure compliance in communication systems. Changes may be made in the function and arrangement of elements discussed without departing from the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming, and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

The UE 120a may include an RF exposure manager 122 that determines a transmit power limit based at least in part on an overlap between a beam and a sensor coverage zone, in accordance with aspects of the present disclosure. Another wireless device in the wireless communication network 100 may alternatively or additionally include an RF exposure manager. For example, one or more of the BSs 110 may be configured as a customer premises equipment (CPE), and an RF exposure manager configured as described herein may be implemented in a BS or CPE.

The UE 120a may receive a beamformed signal from the base station 110 via one or more of the beams 124 (e.g., in one or more receive directions). The UE 120a may transmit a beamformed signal to the base station 110 via one or more of the beams 124 (e.g., in one or more transmit directions).

The term "beam" may be used in the present disclosure in various contexts. Beam may be used to mean a set of gains and/or phases (e.g., pre-coding weights or co-phasing weights) applied to antenna elements in the UE and/or BS for transmission or reception. The term "beam" may also refer to an antenna or radiation pattern of a signal transmitted while applying the gains and/or phases to the antenna elements. Other references to beam may include one or more properties or parameters associated with the antenna (radiation) pattern, such as angle of arrival (AoA), angle of departure (AoD), gain, phase, directivity, beam width, beam direction (with respect to a plane of reference) in terms of azimuth and elevation, peak-to-side-lobe ratio, or an antenna port associated with the antenna (radiation) pattern. The term "beam" may also refer to an associated number and/or configuration of antenna elements (e.g., a uniform linear array, a uniform rectangular array, or other uniform array).

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with UEs 120 in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In certain cases, the network controller 130 may include a centralized unit (CU) and/or a distributed unit (DU), for example, in a 5G NR system. In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

Figure 2:
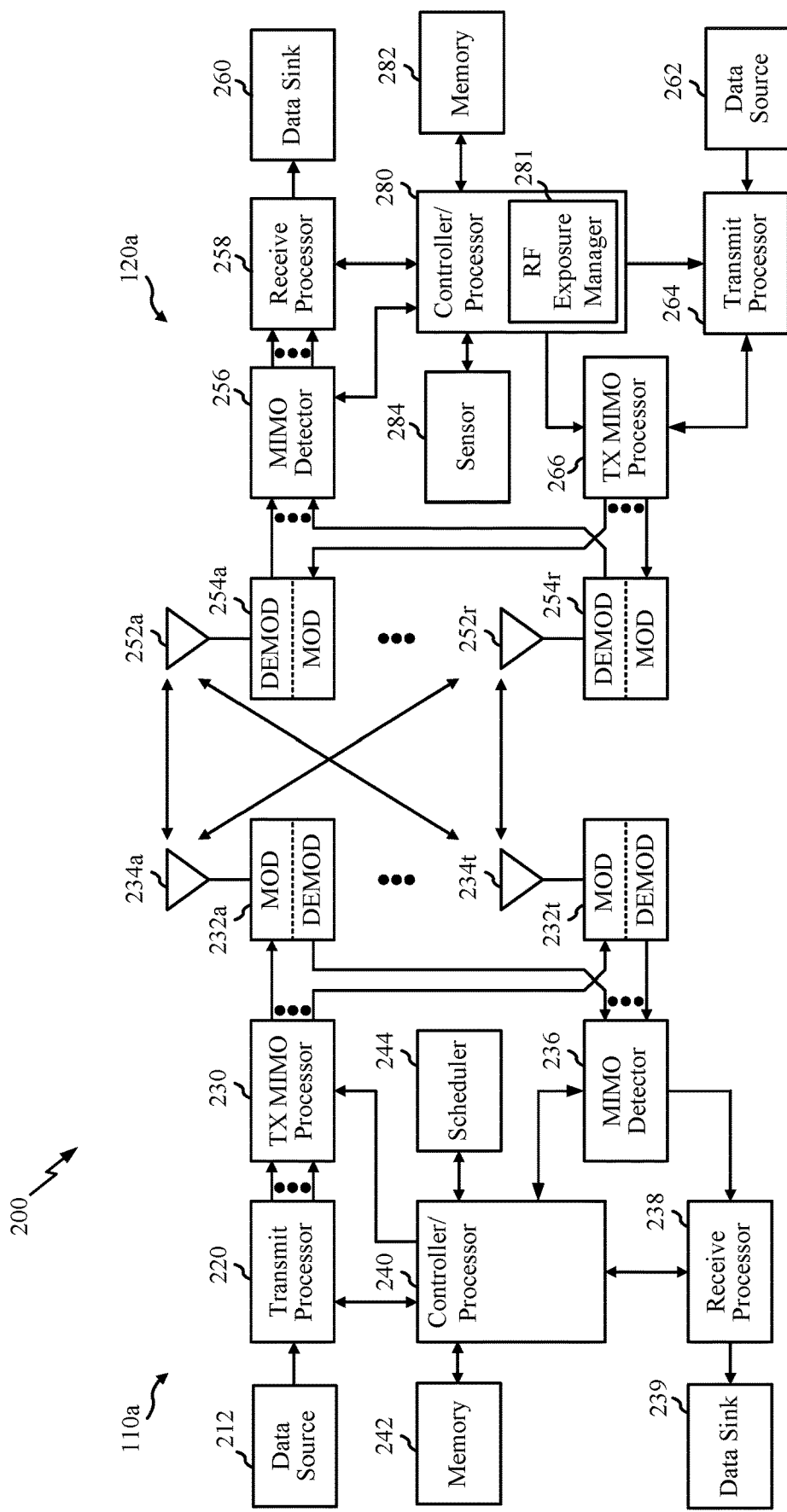
FIG. 2 is a block diagram conceptually illustrating a design of an example base station (BS) and user equipment (UE), in accordance with certain aspects of the present disclosure.

FIG. 2 illustrates example components of BS 110a and UE 120a (e.g., the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. As shown in FIG. 2, the controller/processor 280 of the UE 120a has an RF exposure manager 281 that may be representative of the RF exposure manager 122, according to aspects described herein. Although shown at the controller/processor, other components of the UE 120a and BS 110a may be used to perform the operations described herein.

One or more sensors (represented by sensor 284) may be used to detect the presence of nearby human tissue in proximity to the UE 120. The transceiver 254 can reduce the transmit power to meet an RF exposure limit if human tissue is detected by the sensor 284. Otherwise, the transceiver 254 can maintain a high transmit power level when no human tissue is detected in proximity to the UE 120. A higher average transmission power level may result in wider cell coverage and/or higher uplink throughput. The sensor 284 may be any type of sensor, such as a proximity sensor. In some examples, the sensor 284 is configured as a radar sensor. In some such examples, the radar sensor may be configured to utilize a frequency modulated continuous wave (FMCW).

While the UE 120a is described with respect to FIGS. 1 and 2 as communicating with a BS and/or within a network, the UE 120a may be configured to communicate directly with/transmit directly to another UE 120, or with/to another wireless device without relaying communications through a network. In some aspects, the BS 110a illustrated in FIG. 2 and described above may be an example of another UE 120. Further, as described above, the BS 110a may include an RF exposure manager (for example, which is configured similarly to the RF exposure manager 281) in addition to or instead of the UE 120a. In such examples, the BS 110a may include one or more sensors (for example, similar to the sensor 284). In some examples, the BS 110a as illustrated in FIG. 2 with the addition of an RF exposure manager is representative of a CPE.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 kHz and other SCS may be defined with respect to the base SCS (e.g., 30 kHz, 60 kHz, 120 kHz, 240 kHz, etc.).

Example RF Transceiver

Figure 3:
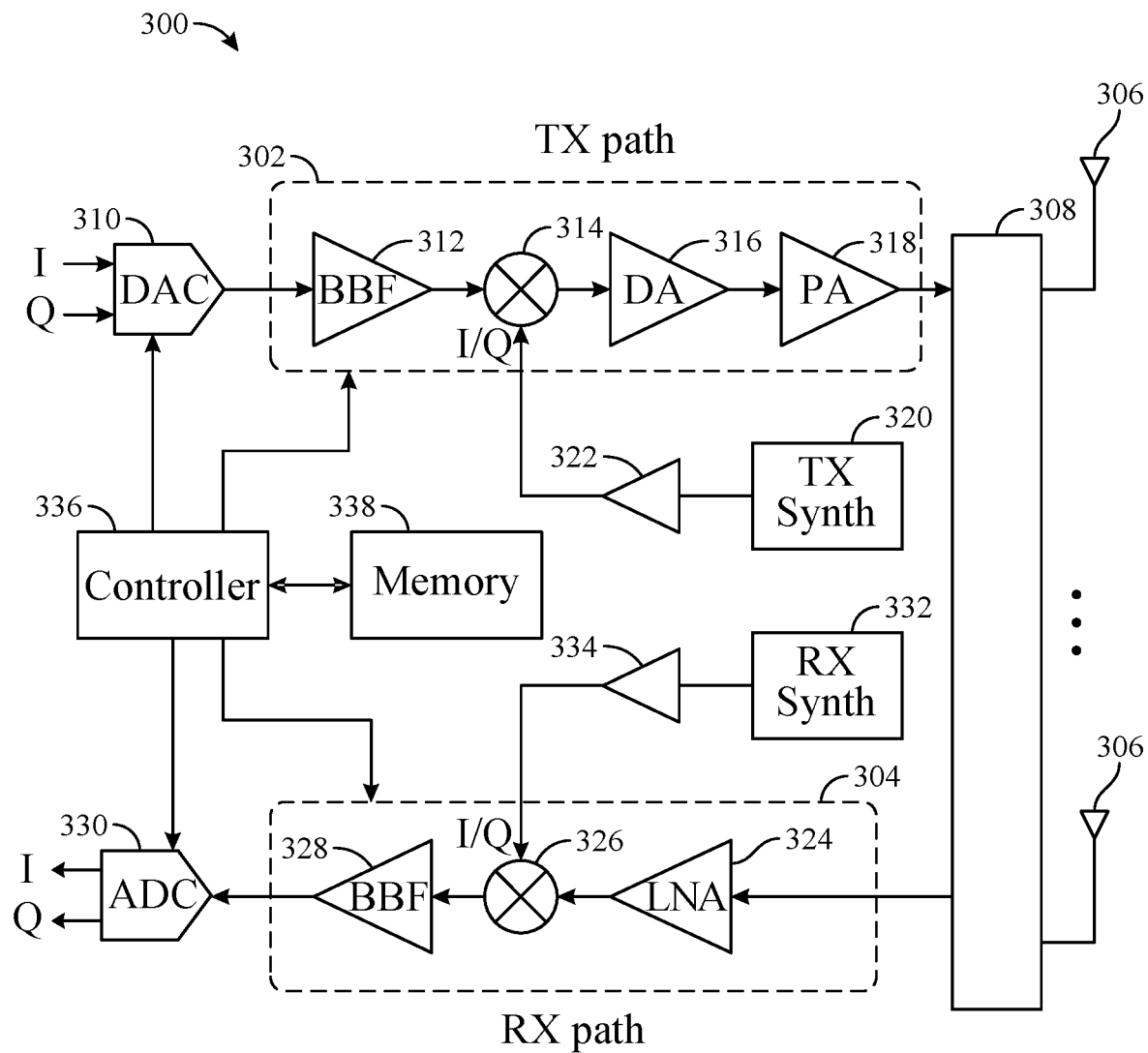
FIG. 3 is a block diagram of an example radio frequency (RF) transceiver, in accordance with certain aspects of the present disclosure.

FIG. 3 is a block diagram of an example RF transceiver circuit 300, which may be used in any of the wireless devices described above, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, and the DA 316 may be included in one or more radio frequency integrated circuits (RFICs). The PA 318 may be external to the RFIC(s) for some implementations.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna 306. While one mixer 314 is illustrated, several mixers may be used to upconvert the filtered baseband signals to one or more intermediate frequencies and to thereafter upconvert the intermediate frequency signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I or Q signals for digital signal processing.

Some systems may employ frequency synthesizers with a voltage-controlled oscillator (VCO) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326.

A controller 336 may direct the operation of the RF transceiver circuit 300, such as transmitting signals via the TX path 302 and/or receiving signals via the RX path 304. The controller 336 may be a processor, a digital signal processor (DSP), an application specific integrated circuit (ASIC), a field programmable gate array (FPGA) or other programmable logic device (PLD), discrete gate or transistor logic, discrete hardware components, or any combination thereof. The memory 338 may store data and program codes for operating the RF transceiver circuit 300. The controller 336 and/or memory 338 may include control logic. In certain cases, the controller 336 may determine a transmit power for the TX path 302 (e.g., certain levels of gain applied at the BBF 312, the DA 316, and/or the PA 318) based on an RF exposure limit set by domestic/foreign regulations and/or international standards as further described herein.

Example RF Exposure Compliance

RF exposure may be expressed in terms of a specific absorption rate (SAR), which measures energy absorption by human tissue per unit mass and may have units of watts per kilogram (W/kg). RF exposure may also be expressed in terms of power density (PD), which measures energy absorption per unit area and may have units of mW/cm². In certain cases, a maximum permissible exposure (MPE) limit in terms of PD may be imposed for wireless communication devices using transmission frequencies above 6 GHz. The MPE limit is a regulatory metric for exposure based on area, e.g., an energy density limit defined as a number, X, watts per square meter (W/m²) averaged over a defined area and time-averaged over a frequency-dependent time window in order to prevent a human exposure hazard represented by a tissue temperature change.

SAR may be used in some configurations to assess RF exposure for transmission frequencies less than 6 GHz, which cover wireless communication technologies such as 2G/3G (e.g., CDMA), 4G (e.g., LTE), 5G (e.g., NR in 6 GHz bands), IEEE 802.11ac, etc. PD may be used in some configurations to assess RF exposure for transmission frequencies higher than 10 GHz, which cover wireless communication technologies such as IEEE 802.11ad, 802.11ay, 5G in mmWave bands, etc. Thus, different metrics may be used to assess RF exposure for different wireless communication technologies.

A wireless communication device (e.g., UE 120, CPE, BS) may simultaneously transmit signals using multiple wireless communication technologies. For example, the wireless communication device may simultaneously transmit signals using a first wireless communication technology operating at or below 6 GHz (e.g., 3G, 4G, 5G, etc.) and a second wireless communication technology operating above 6 GHz (e.g., mmWave 5G in 24 to 60 GHz bands, IEEE 802.11ad or 802.11ay). In certain aspects, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD.

Figure 4A:
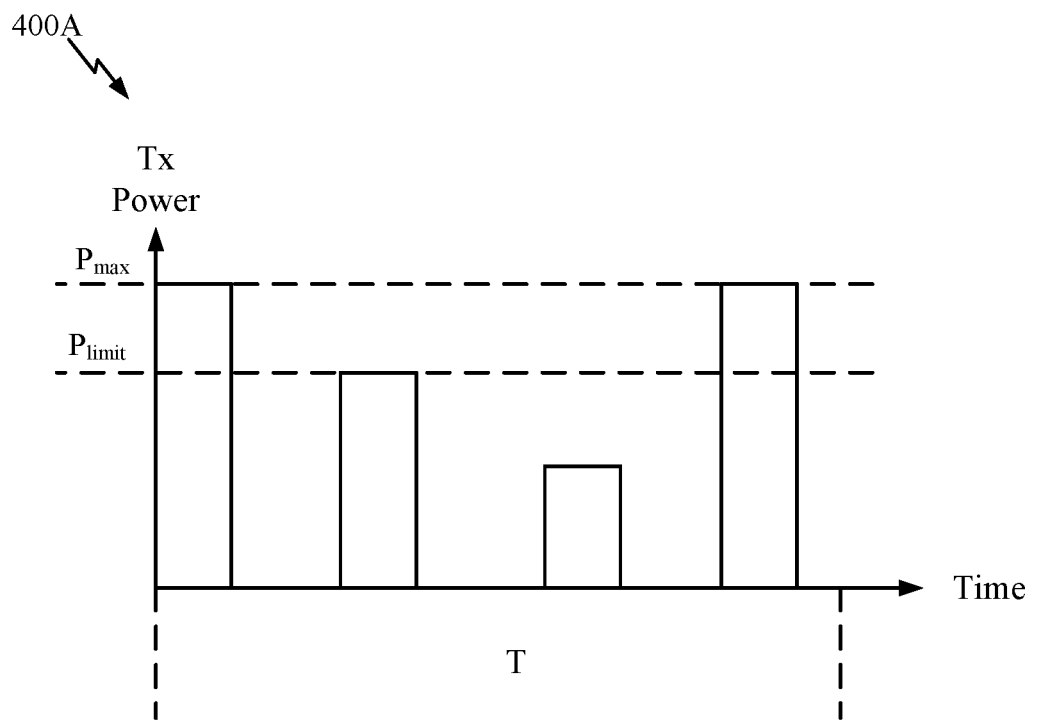
FIGS. 4A and 4B are graphs illustrating examples of transmit powers over time in compliance with an RF exposure limit, in accordance with certain aspects of the present disclosure.

In certain cases, time-averaging of RF exposure may be performed to be in compliance with the RF exposure limit within a specified running time window (T) (e.g., 2 seconds for 60 GHz bands, 100 or 360 seconds for bands ≤6 GHz, etc.) associated with the RF exposure limit. FIG. 4A is a graph 400A of a transmit power that varies over the running time window (T) associated with the time-averaged RF exposure limit, in accordance with certain aspects of the present disclosure. The transmit power may exceed $P_{limit}$ in certain transmission occasions in the time window (T). In certain cases, the wireless communication device may transmit at $P_{max}$, which is the maximum transmit power supported by the wireless communication device or the maximum transmit power that the wireless communication device is capable of outputting. In some cases, the wireless communication device may transmit at a transmit power less than or equal to $P_{limit}$ in certain transmission occasions. The $P_{limit}$ represents the time-averaged threshold for the RF exposure limit in terms of transmit power over the running time window (T), where $P_{limit}$ is the maximum transmit power that the wireless device can transmit continuously in the time window (e.g., throughout the entire duration of the time window) in compliance with the RF exposure limit. In certain cases, $P_{limit}$ may be referred to as the average power level or limit. The graph 400A also illustrates gaps between transmission bursts, where the gaps represent periods during which no transmission was sent from the wireless device.

Figure 4B:
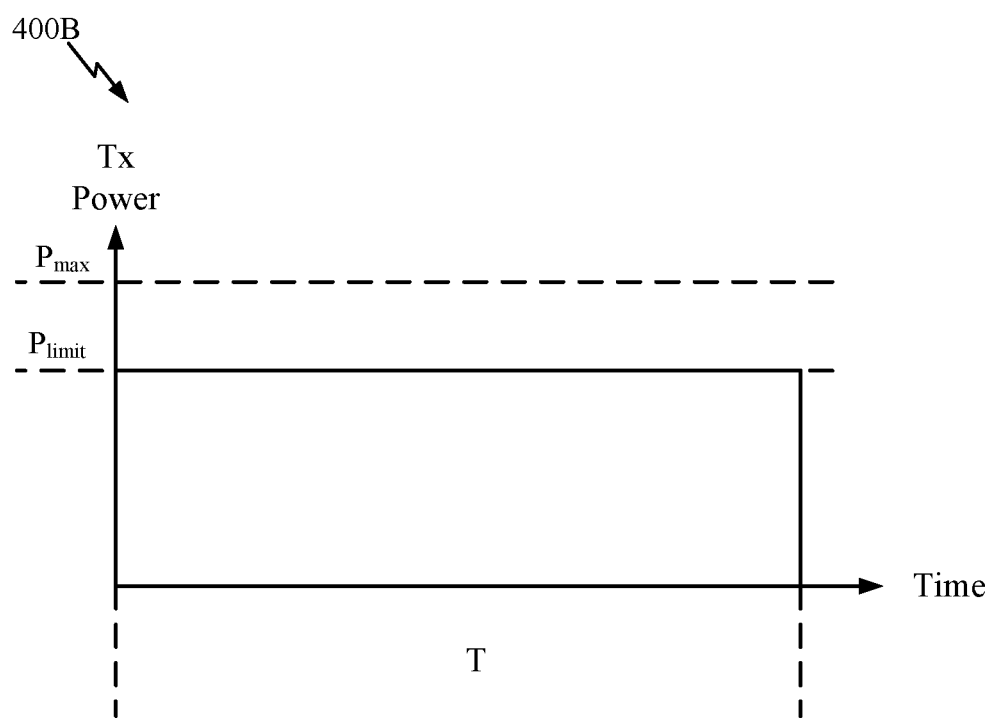

In certain cases, the transmit power may be maintained at the peak transmit power (e.g., $P_{limit}$) allowed for RF exposure compliance that enables continuous transmission during the running time window. For example, FIG. 4B is a graph 400B of a transmit power over time illustrating an example where the transmit power is limited to $P_{limit}$, in accordance with certain aspects of the present disclosure. As shown, the wireless communication device can transmit continuously at $P_{limit}$ in the time window in compliance with the time-averaged RF exposure limit.

To ensure compliance with an RF exposure limit, wireless communication devices may determine a maximum allowed transmission power for a time interval based on an available RF exposure budget, which may be computed based on a maximum available power limit, RF exposure limit, and previous transmission activities (e.g., previous transmit powers). A wireless communication device may have multiple antennas, which can enable the device to transmit via one or more beams. A sensor may have a limited coverage zone (e.g., spatial coverage) for detecting human tissue. In certain cases, the beam for transmission may partially overlap the coverage zone of the sensor, such that one or more portions of the beam are outside the coverage zone. Therefore, the UE should account for (or otherwise consider) the blind spots of the sensor in terms of RF exposure. In some examples, a "blind spot" (e.g., a point or area outside of the spatial coverage or coverage zone) includes any point or area in which an object (or type of object) cannot be identified with a threshold level of reliability or confidence. In some examples, radar signals associated with the sensor 284 will not be received by the sensor 284 when reflected off an object in a blind spot. In other examples, such reflected signals may be received by the sensor 284, but the sensor 284 may not be able to determine with an adequate level of confidence a position or existence of the object, for example due to noise in the environment and/or other factors. In some examples, the sensor can detect the presence of an object in a blind spot, but is unable to determine whether such an object is human tissue (or another type of object) that signifies a reduction in power to satisfy an RF exposure limit.

Figure 5:
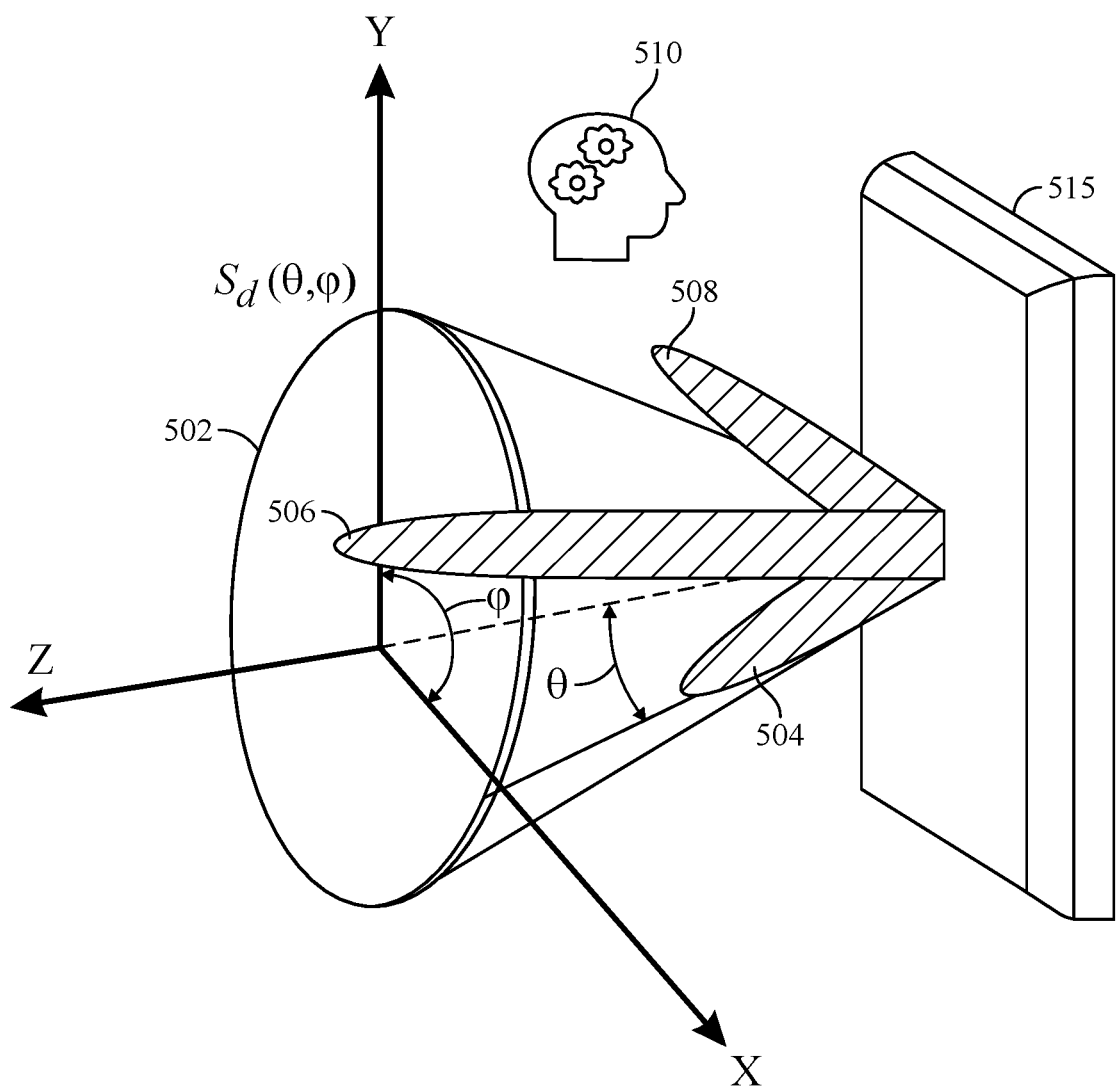
FIG. 5 is a diagram illustrating an example sensor coverage overlapping with a transmission beam, in accordance with certain aspects of the present disclosure.

FIG. 5 is a diagram illustrating an example of a coverage zone of a sensor (e.g., the sensor 284) overlapping with a beam for transmission from a wireless communication device 515 (e.g., UE 120, CPE, BS), in accordance with certain aspects of the present disclosure. The sensor (not shown) of the wireless communication device may have a coverage zone 502 (e.g., $S_{d_{max}}$ (θ, φ)) with a maximum distance of $d_{max}$ from the wireless communication device as described herein. For example, the maximum reach of the coverage zone 502 may be determined based on the probability of detection Pd at maximum distance $d_{max}$ within that coverage meeting a target confidence level $Pd_{TRGT}$, where $S_{d_{max}}$ may be the maximum surface area such that Pd(θ, φ)≥$Pd_{TRGT}$ ∀(θ, φ)∈ $S_{d_{max}}$. In this example, a beam 504 used for transmission from the UE 102 may have a radiation pattern that overlaps with the coverage zone 502. For example, a primary lobe 506 of the beam 504 may lie within the coverage zone 502, whereas a secondary lobe 508 may extend outside the coverage zone 502. The secondary lobe 508 may be representative of a portion of the radiation pattern associated with the beam 504, such as radio leakage outside the primary lobe 506 of the beam 504. In certain cases, human tissue 510 may reside in the blind spot of the sensor (e.g., outside the coverage zone 502), and a UE may not take into account the presence of the human tissue 510 when determining the transmit power for the beam 504, which may lead to overexposure in terms of an RF exposure limit. In some examples, the lobes 506, 508 are not representative of "lobes" of a single beam, but rather are representative of a radiation pattern of multiple beams which may be transmitted from an antenna array.

FIG. 5 illustrates a configuration in which the sensor (and/or a coverage zone of the sensor) is roughly aligned with one or more beams for transmission. In other examples, the sensor is offset from the beam(s) for transmission such that the coverage zone appears to originate from a location different from which the beam(s) for transmission originates. In some such examples, an overlap between the coverage zone and the beam(s) for transmission may be less or more extensive than illustrated. In some examples, the coverage zone for a sensor may overlap with beams from multiple antenna arrays, and operations described herein may be performed for each such beam. Similarly, beams (or lobes of a beam) from one or more antenna arrays may overlap with the coverage zones of multiple sensors, and operations described herein may be performed for each such beam/lobe and/or corresponding sensor(s).

Accordingly, what is needed are techniques and apparatus for determining a transmit power limit that takes into account (or otherwise considers) the blind spots of a sensor.

Example Transmit Power Limit Based on Sensor Spatial Coverage

Aspects of the present disclosure provide techniques and apparatus for determining a transmit power limit based on sensor spatial coverage, as further described herein. A wireless communication device may consider the radio exposure level of a transmission within and outside the sensor coverage in determining the transmit power limit, for example, when the wireless communication device detects that no human tissue is in the sensor coverage. Within the sensor coverage, the transmit power limit may be at or below an RF exposure limit for the maximum distance of the spatial coverage. Outside the spatial coverage, the transmit power limit may be at or below an RF exposure limit for a specified distance (e.g., 20 centimeters) based on the assumption that human tissue may be located within the specified distance in the blind spot of the sensor. In certain aspects, the wireless communication device may apply a constraint for determining a transmit power limit that selects a minimum (e.g., a smallest value) among certain factors indicative of the RF exposure limits for inside and outside the sensor coverage, as further described herein.

The techniques for determining the transmit power limit described herein may provide desirable uplink communication performance (e.g., higher uplink throughput, reduced latencies, and/or desirable cell coverage) in compliance with RF exposure limits, for example, when using a higher transmit power level when no human tissue is detected. The techniques for determining the transmit power limit described herein may prevent or mitigate overexposure of human tissue to certain radio frequencies, for example, due to beam selection that considers the coverage zone of a proximity sensor and the radiation pattern of beams.

Figure 6:
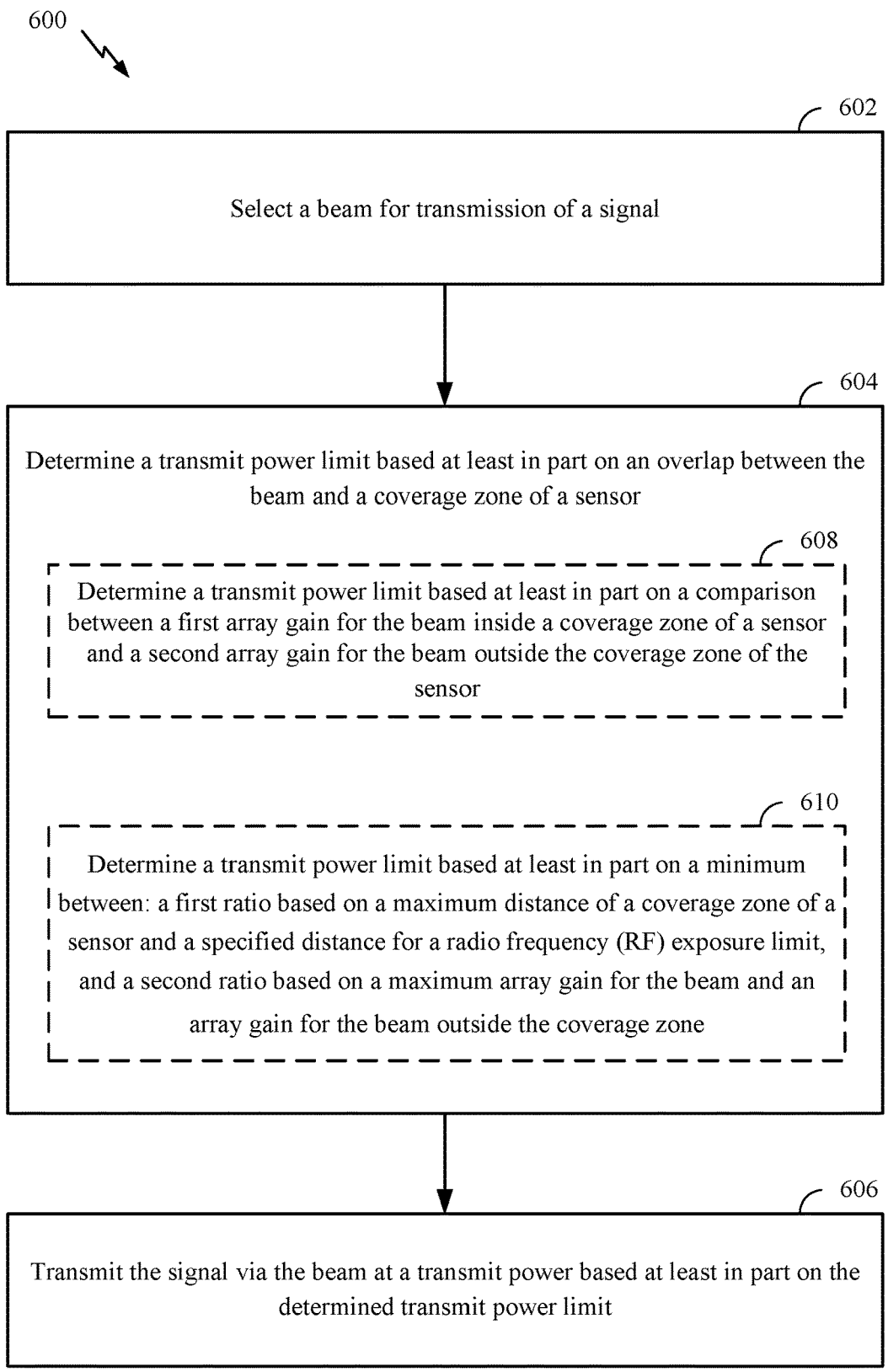
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed by a wireless communication device, such as any wireless communication device in the wireless communication network 100, for example by a UE, an access point, a CPE, or a base station. The description below will reference a UE (such as the UE 120a in the wireless communication network 100) performing the operations 600 for example purposes. The operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 602, where the UE may select a beam (e.g., one of the beams 124) for transmission of a signal. As an example, the UE may select the beam providing the strongest channel conditions between the UE and a network entity (e.g., the BS 110) or another wireless device (e.g., a UE). The UE may select the beam with the highest reference signal received power (RSRP) of a reference signal (which may correspond to a particular beam) from the network entity. Those of skill in the art will appreciate that the UE may use other suitable methods and/or factors for selecting a beam, such as selecting the beam based on RF exposure limit, uplink channel conditions, mobility state, etc.

At block 604, the UE may determine a transmit power limit (e.g., a transmit power at or below $P_{max}$ and/or $P_{limit}$ as described herein with respect to FIGS. 4A and 4B) based at least in part on an overlap between the beam and a coverage zone (e.g., the coverage zone 502 as depicted in FIG. 5) of a sensor (e.g., the sensor 284). For example, the UE may determine a transmit power limit based at least in part a minimum (e.g., a smallest value) among certain factors indicative of the RF exposure levels for inside and outside the sensor coverage, as further described herein. In certain aspects, the transmit power limit determined at block 604 may be used when no human tissue is detected in the coverage zone of the sensor. As an example, the UE may check (e.g., scan) for human tissue within the coverage zone, and if no human tissue is detected in the coverage zone, the UE may apply the transmit power limit determined at block 604.

At block 606, the UE may transmit the signal via the beam at a transmit power based at least in part on the determined transmit power limit. For example, the UE may transmit the signal at a transmit power that is less than or equal to the transmit power limit determined at block 604. The transmit power limit may allow the UE to prevent or mitigate overexposure of human tissue at certain frequency bands, for example, due to blind spots in the coverage zone of the sensor. The transmit power limit may be a dynamic upper limit for the transmit power. In certain cases, other considerations or criteria may cause the transmit power to be lower than the transmit power limit (e.g., due to past high power transmissions leaving not enough exposure margin to transmit at the transmit power limit, or due to other factors like thermal throttling, etc.).

In certain aspects, the UE may determine the transmit power limit based on array gains inside and outside the coverage zone of the sensor. Such array gains and whether they are inside or outside of the coverage zone may be determined by the UE and/or may be determined using a separate processing system in a characterization or calibration operation conducted in a factory or by a manufacturer. For example, points or areas at which the coverage zone and beam(s) for transmission overlap, and the gains at such points or areas, may be determined during a characterization procedure prior to a user obtaining the UE, and certain of the values or measurements described below may be stored in the UE, for example in the RF exposure manager 281 and/or the memory 282.

As an example, the transmit power limit for a given beam j may be determined in accordance with the following expression:

$$P_{limit,j}(d_{max}) \leq 4\pi\omega * \min\left(\frac{d_{max}^2}{AG_{max,inside,j}}, \frac{d_0^2}{AG_{max,outside,j}}\right) \quad (1)$$

where $d_{max}$ may be a maximum distance of the coverage zone for the sensor at the UE. $d_0$ may be a specified distance (e.g., 20 cm) for an RF exposure limit where a specific RF exposure limit may be applied if human tissue is at or within the specified distance from the UE. The specified distance $d_0$ may be set by a regulatory or standards body, such as the Federal Communications Commission (FCC) in the United States. For example, for a certain device category (e.g., a mobile wireless communication device), an RF exposure limit (e.g., the MPE PD limit) may be applicable for a specified distance $d_0$ from the UE, for example, 20 cm and beyond. In certain cases, the specified distance $d_0$ may be in a far field region of the UE. $\omega$ may be the RF exposure limit at a specific frequency band (e.g., $\omega=1$ mW per cm$^2$ for the FCC MPE limit in mmWave frequency bands). $AG_{max,inside,j}$ may be the maximum array gain within the coverage zone of the sensor $$\left(e.g., \max_{\forall(\theta,\varphi)\in S_{d_{max}}} AG_j(\theta, \varphi)\right)$$

for beam j. $AG_{max,outside,j}$ may be the maximum array gain outside the coverage zone of the sensor $$\left(e.g., \max_{\forall(\theta,\varphi)\notin S_{d_{max}}} AG_j(\theta, \varphi)\right)$$

for beam j, and $P_{limit,j}(d_{max})$ may be the maximum transmit power limit for beam j at $d_{max}$. For example, assuming there is continuous uplink traffic for the time window T as depicted in FIG. 4B (e.g., 100% uplink duty cycle), $P_{limit,j}(d_{max})$ may be representative of the maximum transmit power per antenna element under such a scenario. The coverage zone of a sensor $S_{d_{max}}$ may be determined based on the probability of detection Pd at maximum distance $d_{max}$ within that coverage meeting a target confidence level $Pd_{TRGT}$. In certain aspects, the maximum distance of $d_{max}$ may depend on the probability of detecting an object at the distance $d_{max}$ within a certain confidence level (e.g., 90%). Temporal combining for the detection results from the sensor may be applied to improve the target confidence level. For example, the detection results taken over a certain time period may be combined in order to ensure a certain confidence level.

For example, at block 608, the UE may determine the transmit power limit based at least in part on a comparison between a first array gain (e.g., $AG_{max,inside,j}$) for the beam inside the coverage zone and a second array gain (e.g., $AG_{max,outside,j}$) for the beam outside the coverage zone of the sensor. The comparison (which may be performed by the UE or may have been performed in a factory or characterization procedure using a separate processing system) may include determining a minimum (e.g., a smallest value) between (e.g., of or among) a first term based on the first array gain and a second term based on the second array gain (e.g., the smallest value of a first reciprocal of the first array gain and a second reciprocal of the second array gain). The first array gain may be a first maximum gain (e.g., the largest gain) among a first plurality of array gains at different positions (e.g., at angles $\theta$ and $\varphi$ as described herein with respect to FIG. 5) of the beam inside the coverage zone. The second array gain may be a second maximum gain (e.g., the largest gain) among a second plurality of array gains at different positions (e.g., $\theta$ and $\varphi$) of the beam outside the coverage zone. The transmit power limit may be determined based at least in part on a maximum distance (e.g., $d_{max}$) of the coverage zone and a specified distance (e.g., $d_0$) for an RF exposure limit. For example, the transmit power limit may be determined based at least in part on the minimum (e.g., the smallest value) between (e.g., of or among) a reciprocal of the first array gain times a first area (e.g., a product of the reciprocal of the first array gain and the first area) and a reciprocal of the second array gain times a second area (e.g., a product of the reciprocal of the second array gain and the second area). The first area may be a first spherical surface area with the maximum distance (e.g., $d_{max}$) of the coverage zone as a radius of the first spherical surface area, and the second area may be a second spherical surface area with the specified distance (e.g., $d_0$) for the RF exposure limit as a radius of the second spherical surface area. In certain aspects, the first and second areas may include the surface areas of other shapes, which may be representative of the coverage zone, such as a conical surface area, a torus surface area, a cylindrical surface area, etc. The determination of the power limit by the UE at block 608 may be based on one or more stored values, and/or based on a determined beam (and/or beam codebook) with which the UE is going to transmit, and/or whether an object is detected by a sensor of the UE (and/or a position and/or type of the object).

For certain aspects, the transmit power limit is based at least in part on certain ratios. For example, the transmit power limit may be determined in accordance with the following expression:

$$P_{limit,j}(d_{max}) \leq P_{limit,j}(d_0) * \min\left(\frac{d_{max}^2}{d_0^2}, \frac{AG_{max,j}}{AG_{max,outside,j}}\right) \quad (2)$$

where $P_{limit,j}(d_0)$ may be the maximum transmit power at the specified distance $d_0$ for the RF exposure limit $$\left(\text{e.g.,} \frac{4\pi\omega * d_0^2}{AG_{max,j}}\right);$$

and $AG_{max,j}$ may be the overall maximum array gain for the beam j.

As an example, at block 610, the UE may determine the transmit power limit based at least in part on a minimum (e.g., the smallest value) between (e.g., of or among) a first ratio $$\left(\text{e.g.,} \frac{d_{max}^2}{d_0^2}\right)$$

based on a maximum distance of a coverage zone of a sensor and a specified distance for an RF exposure limit, and a second ratio $$\left(\text{e.g.,} \frac{AG_{max,j}}{AG_{max,outside,j}}\right)$$

based on a maximum array gain for the beam and an array gain for the beam outside the coverage zone. The first ratio may be between a square of the maximum distance and a square of the specified distance (e.g., a ratio of the square of the maximum distance to the square of the specified distance), and the second ratio may be between the maximum array gain and the array gain for the beam outside the coverage zone (e.g., a ratio of the maximum array gain to the array gain for the beam outside the coverage zone). The array gain for the beam outside the coverage zone may be a maximum gain among a plurality of array gains at different positions of the beam outside the coverage zone. The transmit power limit (e.g., $P_{limit,j}(d_{max})$) may be for the selected beam and at the maximum distance of the coverage zone of the sensor, and the transmit power limit may be determined to be less than or equal to a product of the minimum (smallest) ratio and another transmit power limit (e.g., $P_{limit,j}(d_0)$) at the specified distance for the RF exposure limit. The determination of the power limit by the UE at block 610 may be based on one or more stored values, and/or based on a determined beam (and/or beam codebook) with which the UE is going to transmit, and/or whether an object is detected by a sensor of the UE (and/or a position and/or type of the object).

In certain aspects, the RF exposure limit may include a time-averaged power density limit for mmWave frequency bands. The RF exposure may be time-averaged over a running time window as described herein with respect to FIGS. 4A and 4B. For example, the UE may perform a time-averaged RF exposure evaluation to determine compliance with the RF exposure limit over a running time window.

When the sensor reports no human tissue at distances below $d_{max}$ within the sensor coverage, a wireless device may ensure that the radio exposure level within the sensor coverage is at or below the RF exposure limit at distance $d_{max}$ and that human tissue in the blind spots of the sensor are not overexposed in terms of the RF exposure limit. For example, the radio exposure leakage outside the sensor coverage may be at or below the RF exposure limit at the specified distance $d_0$. The radio exposure level within the sensor coverage may be given by the following expression:

$$\frac{P_{limit,j}(d_{max}) \max_{\forall(\theta,\varphi)\in S_{d_{max}}} AG_j(\theta, \varphi)}{4\pi d_{max}^2} \leq \omega \text{ mWatt per cm}^2 \quad (3)$$

where $AG_j(\theta,\varphi)$ may be the total antenna array gain of traffic beam j at angles $\theta$ and $\varphi$, for example as depicted in FIG. 5. The radio exposure level outside the sensor coverage may be given by the following expression:

$$\frac{P_{limit,j}(d_{max}) \max_{\forall(\theta,\varphi)\notin S_{d_{max}}} AG_j(\theta,\varphi)}{4\pi d_0^2} \le \omega \text{ mWatt per cm}^2 \quad (4)$$

To satisfy these conditions for inside and outside the sensor coverage, the transmit power limit $P_{limit,j}(d_{max})$ for traffic beam j at $d_{max}$ distance may be given by Expressions (1) or (2) as described herein. In certain cases, the transmit power limit $P_{limit,j}(d_{max})$ may be given by the following equivalent expressions:

$$P_{limit,j}(d_{max}) \le \frac{4\pi\omega * d_0^2}{AG_{max,j}} * \min\left(\frac{AG_{max,j} * d_{max}^2}{AG_{max,inside,j} * d_0^2}, \frac{AG_{max,j}}{AG_{max,outside,j}}\right) \quad (5)$$

$$P_{limit,j}(d_{max}) \le P_{limit,j}(d_0) * \min\left(\frac{AG_{max,j} * d_{max}^2}{AG_{max,inside,j} * d_0^2}, \frac{AG_{max,j}}{AG_{max,outside,j}}\right) \quad (6)$$

In certain aspects, the resulting transmit power limit and/or certain factors in the expression(s) described herein may be pre-calculated and/or pre-determined for each beam, and the resulting transmit power limit and/or factors may be populated in a mapping between the beam and the transmit power limit (e.g., in a look-up table in the RF exposure manager 281 and/or memory 282). For example, the maximum coverage zone of a sensor may be determined according to a probability of detection within a maximum distance satisfying a certain confidence level, as described herein.

For each traffic beam j, the array gain $AG_j(\theta,\varphi)$ of traffic beam j at all angles $\theta$ and $\varphi$ may be measured and/or estimated, where the array gains are expected to include the overall maximum array gain $(AG_{max,j})$, the maximum array gain inside the sensor coverage $(AG_{max,inside,j})$, and maximum array gain outside the sensor coverage $(AG_{max,outside,j})$. The overall maximum array gain for each traffic beam may be identified within the measured array gains for the respective beam, where $$AG_{max,j} = \max_{\forall(\theta,\varphi)} AG_j(\theta,\varphi).$$

The maximum array gain $AG_{max,outside,j}$ outside the sensor coverage $S_{d_{max}}$ for each traffic beam may be identified within the measured gains for the respective gains, where $$AG_{max,outside,j} = \max_{\forall(\theta,\varphi)\notin S_{d_{max}}} AG_j(\theta,\varphi).$$

The maximum array gain $AG_{max,inside,j}$ inside the sensor coverage $S_{d_{max}}$ for each traffic beam may be identified within the measured gains for the respective beam, where $$AG_{max,inside,j} = \max_{\forall(\theta,\varphi)\in S_{d_{max}}} AG_j(\theta,\varphi).$$

In aspects, the factors for maximum array gains (e.g., $AG_{max,j}$, $AG_{max,inside,j}$, and $AG_{max,outside,j}$) may be linear values. The maximum transmit power limit for traffic beam j at distance $d_{max}$ may be calculated according to Expression (1), Expression (2), Expression (5), and/or Expression (6), as described herein. The resulting maximum transmit power limit for each beam may be populated into a look-up table, which may enable the UE to determine the maximum transmit power limit for a particular beam, at block 604. The UE may store the look-up table having the various maximum transmit power limits per beam, and the UE may access the look-up table to determine the maximum transmit power limit for a particular beam. For example, the UE may select the transmit power limit for a particular beam from the look-up table using a beam identifier or index associated with the beam, which may be mapped to the transmit power limit.

While the examples depicted in FIGS. 1-8 are described herein with respect to a UE performing the various methods to facilitate understanding, aspects of the present disclosure may also be applied to other wireless devices, such as a wireless station, an access point, a base station, and/or a customer premises equipment (CPE), performing the methods described herein. Further, while the examples are described with respect to communications between a UE (or other wireless device) and a network entity, the UE or other wireless device may be communicating with a device other than a network entity, for example, another UE or with another device in a user's home that is not a network entity.

It will be appreciated that the techniques for determining the transmit power limit may provide various advantages, such as desirable uplink performance in compliance with RF exposure standards and/or regulations.

Figure 7:
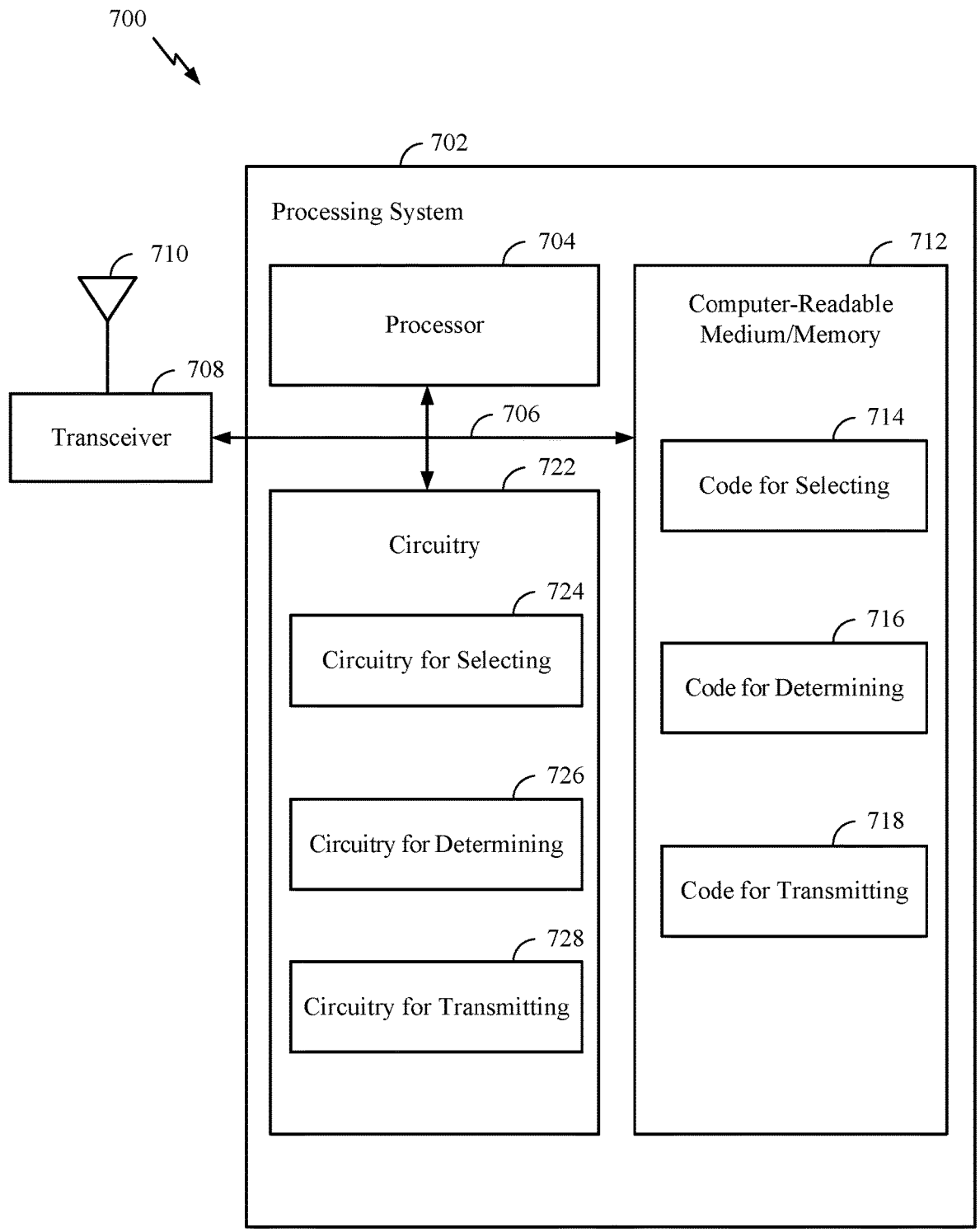
FIG. 7 illustrates a communications device that may include various components configured to perform operations for the techniques disclosed herein, in accordance with aspects of the present disclosure.

FIG. 7 illustrates a communications device 700 that may include various components (e.g., corresponding to means-plus-function components) configured to perform operations for the techniques disclosed herein, such as the operations 600 illustrated in FIG. 6. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations 600 illustrated in FIG. 6, or other operations for performing the various techniques discussed herein for RF exposure compliance. In certain aspects, computer-readable medium/memory 712 stores code for selecting 714, code for determining 716, and/or code for transmitting 718. In certain aspects, the processing system 702 has circuitry 722 configured to implement the code stored in the computer-readable medium/memory 712. In certain aspects, the circuitry 722 is coupled to the processor 704 and/or the computer-readable medium/memory 712 via the bus 706. For example, the circuitry 722 includes circuitry for selecting 724, circuitry for determining 726, and/or circuitry for transmitting 728.

For example, means for transmitting (or means for outputting for transmission) may include a transmitter and one or more antennas, such as the transceiver 254 and/or antenna(s) 252 of the UE 120a or the transceiver 232 and/or antenna(s) 234 of the BS 110a illustrated in FIG. 2 and/or circuitry for transmitting 728 of the communication device 700 in FIG. 7. Means for selecting and/or means for determining may include a processing system, which may include one or more processors, such as the transmit processor 220, the TX MIMO processor 230, the receive processor 238, and/or the controller/processor 240 of the BS 110a or the receive processor 258, the transmit processor 264, the TX MIMO processor 266, and/or the controller/processor 280 of the UE 120a illustrated in FIG. 2, and/or the processing system 702 of the communication device 700 in FIG. 7.

Example Aspects

In addition to the various aspects described above, specific combinations of aspects are within the scope of the disclosure, some of which are detailed below:

Aspect 1: A method of wireless communication, comprising: selecting a beam for transmission of a signal; determining a transmit power limit based at least in part on a comparison between a first array gain for the beam inside a coverage zone of a sensor and a second array gain for the beam outside the coverage zone of the sensor; and transmitting the signal via the beam at a transmit power based at least in part on the determined transmit power limit.

Aspect 2: The method of Aspect 1, wherein the first array gain is a first maximum gain among a first plurality of array gains at different positions of the beam inside the coverage zone, and wherein the second array gain is a second maximum gain among a second plurality of array gains at different positions of the beam outside the coverage zone.

Aspect 3: The method according to Aspect 1 or 2, wherein determining the transmit power limit comprises determining the transmit power limit based at least in part on a maximum distance of the coverage zone and a specified distance for a radio frequency (RF) exposure limit.

Aspect 4: The method according to any of Aspects 1-3, wherein determining the transmit power limit comprises determining the transmit power limit based at least in part on a minimum between a reciprocal of the first array gain times a first area and a reciprocal of the second array gain times a second area.

Aspect 5: The method of Aspect 4, wherein the first area is a first spherical surface area with a maximum distance of the coverage zone as a radius of the first spherical surface area, and wherein the second area is a second spherical surface area with a specified distance for a radio frequency (RF) exposure limit as a radius of the second spherical surface area.

Aspect 6: The method of Aspect 5, wherein the RF exposure limit is a time-averaged power density limit for mmWave frequency bands.

Aspect 7: The method according to any of Aspects 1-6, wherein transmitting the signal comprises transmitting the signal at the transmit power less than or equal to the transmit power limit.

Aspect 8: A method of wireless communication, comprising: selecting a beam for transmission of a signal; determining a transmit power limit based at least in part on a minimum between: a first ratio based on a maximum distance of a coverage zone of a sensor and a specified distance for a radio frequency (RF) exposure limit, and a second ratio based on a maximum array gain for the beam and an array gain for the beam outside the coverage zone; and transmitting the signal via the beam at a transmit power based at least in part on the determined transmit power limit.

Aspect 9: The method of Aspect 8, wherein the first ratio is between a square of the maximum distance and a square of the specified distance, and wherein the second ratio is between the maximum array gain for the beam and the array gain for the beam outside the coverage zone.

Aspect 10: The method according to Aspect 8 or 9, wherein the array gain for the beam outside the coverage zone is a maximum gain among a plurality of array gains at different positions of the beam outside the coverage zone.

Aspect 11: The method according to any of Aspects 8-10, wherein the transmit power limit is for the selected beam and at the maximum distance of the coverage zone of the sensor, and wherein the transmit power limit is determined to be less than or equal to a product of the minimum and another transmit power limit at the specified distance for the RF exposure limit.

Aspect 12: The method according to any of Aspects 8-11, wherein the RF exposure limit is a time-averaged power density limit for mmWave frequency bands.

Aspect 13: The method according to any of Aspects 8-12, wherein transmitting the signal comprises transmitting the signal at the transmit power less than or equal to the transmit power limit.

Aspect 14: An apparatus, comprising: a memory comprising executable instructions; one or more processors configured to execute the executable instructions and cause the apparatus to perform a method in accordance with any of Aspects 1-13.

Aspect 15: An apparatus, comprising means for performing a method in accordance with any of Aspects 1-13.

Aspect 16: A computer-readable medium comprising executable instructions that, when executed by one or more processors of an apparatus, cause the apparatus to perform a method in accordance with any of Aspects 1-13.

Aspect 17: A computer program product embodied on a computer-readable storage medium comprising code for performing a method in accordance with any of Aspects 1-13.

Aspect 18: An apparatus for wireless communication, comprising: a memory; and a processor coupled to the memory, the processor being configured to: select a beam for transmission of a signal, determine a transmit power limit based at least in part on a comparison between a first array gain for the beam inside a coverage zone of a sensor and a second array gain for the beam outside the coverage zone of the sensor, and transmit the signal via the beam at a transmit power based at least in part on the determined transmit power limit.

Aspect 19: The apparatus of Aspect 18, wherein the first array gain is a first maximum gain among a first plurality of array gains at different positions of the beam inside the coverage zone, and wherein the second array gain is a second maximum gain among a second plurality of array gains at different positions of the beam outside the coverage zone.

Aspect 20: The apparatus of Aspect 18 or 19, wherein to determine the transmit power limit, the processor is further configured to determine the transmit power limit based at least in part on a maximum distance of the coverage zone and a specified distance for a radio frequency (RF) exposure limit.

Aspect 21: The apparatus according to any of Aspects 18-20, wherein to determine the transmit power limit, the processor is further configured to determine the transmit power limit based at least in part on a minimum between a reciprocal of the first array gain times a first area and a reciprocal of the second array gain times a second area.

Aspect 22: The apparatus of Aspect 21, wherein the first area is a first spherical surface area with a maximum distance of the coverage zone as a radius of the first spherical surface area, and wherein the second area is a second spherical surface area with a specified distance for a radio frequency (RF) exposure limit as a radius of the second spherical surface area.

Aspect 23: The apparatus of Aspect 22, wherein the RF exposure limit is a time-averaged power density limit for mmWave frequency bands.

Aspect 24: The apparatus according to any of Aspects 18-23, wherein to transmit the signal, the processor is further configured to transmit the signal at the transmit power less than or equal to the transmit power limit.

Aspect 25: An apparatus for wireless communication, comprising: a memory; and a processor coupled to the memory, the processor being configured to: select a beam for transmission of a signal; determine a transmit power limit based at least in part on a minimum between: a first ratio based on a maximum distance of a coverage zone of a sensor and a specified distance for a radio frequency (RF) exposure limit, and a second ratio based on a maximum array gain for the beam and an array gain for the beam outside the coverage zone; and transmit the signal via the beam at a transmit power based at least in part on the determined transmit power limit.

Aspect 26: The apparatus of Aspect 25, wherein the first ratio is between a square of the maximum distance and a square of the specified distance, and wherein the second ratio is between the maximum array gain for the beam and the array gain for the beam outside the coverage zone.

Aspect 27: The apparatus of Aspect 25 or 26, wherein the array gain for the beam outside the coverage zone is a maximum gain among a plurality of array gains at different positions of the beam outside the coverage zone.

Aspect 28: The apparatus according to any of Aspects 25-27, wherein the transmit power limit is for the selected beam and at the maximum distance of the coverage zone of the sensor, and wherein the transmit power limit is determined to be less than or equal to a product of the minimum and another transmit power limit at the specified distance for the RF exposure limit.

Aspect 29: The apparatus according to any of Aspects 25-28, wherein the RF exposure limit is a time-averaged power density limit for mmWave frequency bands.

Aspect 30: The apparatus according to any of Aspects 25-29, wherein to transmit the signal, the processor is further configured to transmit the signal at the transmit power less than or equal to the transmit power limit.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a closed subscriber group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another. In other words, unless a specific order of steps or actions is specified, the order and/or use of specific steps and/or actions may be modified.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer-readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above can also be considered as examples of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device.

Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above.

The invention claimed is:

1. A method of wireless communication, comprising:
selecting a beam for transmission of a signal;
determining a transmit power limit based at least in part on a comparison between a first array gain for the beam inside a coverage zone of a sensor and a second array gain for the beam outside the coverage zone of the sensor; and
transmitting the signal via the beam at a transmit power based at least in part on the determined transmit power limit.

2. The method of claim 1, wherein the first array gain is a first maximum gain among a first plurality of array gains at different positions of the beam inside the coverage zone, and wherein the second array gain is a second maximum gain among a second plurality of array gains at different positions of the beam outside the coverage zone.

3. The method of claim 1, wherein determining the transmit power limit comprises determining the transmit power limit based at least in part on a maximum distance of the coverage zone and a specified distance for a radio frequency (RF) exposure limit.

4. The method of claim 1, wherein determining the transmit power limit comprises determining the transmit power limit based at least in part on a minimum between a reciprocal of the first array gain times a first area and a reciprocal of the second array gain times a second area.

5. The method of claim 4, wherein the first area is a first spherical surface area with a maximum distance of the coverage zone as a radius of the first spherical surface area, and wherein the second area is a second spherical surface area with a specified distance for a radio frequency (RF) exposure limit as a radius of the second spherical surface area.

6. The method of claim 5, wherein the RF exposure limit is a time-averaged power density limit for mmWave frequency bands.

7. The method of claim 1, wherein transmitting the signal comprises transmitting the signal at the transmit power less than or equal to the transmit power limit.

8. A method of wireless communication, comprising:
selecting a beam for transmission of a signal;
determining a transmit power limit based at least in part on a minimum between:
a first ratio based on a maximum distance of a coverage zone of a sensor and a specified distance for a radio frequency (RF) exposure limit, and
a second ratio based on a maximum array gain for the beam and an array gain for the beam outside the coverage zone; and
transmitting the signal via the beam at a transmit power based at least in part on the determined transmit power limit.

9. The method of claim 8, wherein the first ratio is between a square of the maximum distance and a square of the specified distance, and wherein the second ratio is between the maximum array gain for the beam and the array gain for the beam outside the coverage zone.

10. The method of claim 8, wherein the array gain for the beam outside the coverage zone is a maximum gain among a plurality of array gains at different positions of the beam outside the coverage zone.

11. The method of claim 8, wherein the transmit power limit is for the selected beam and at the maximum distance of the coverage zone of the sensor, and wherein the transmit power limit is determined to be less than or equal to a product of the minimum and another transmit power limit at the specified distance for the RF exposure limit.

12. The method of claim 8, wherein the RF exposure limit is a time-averaged power density limit for mmWave frequency bands.

13. The method of claim 8, wherein transmitting the signal comprises transmitting the signal at the transmit power less than or equal to the transmit power limit.

14. An apparatus for wireless communication, comprising:
   a memory; and
   a processor coupled to the memory, the processor being configured to:
      select a beam for transmission of a signal,
      determine a transmit power limit based at least in part on a comparison between a first array gain for the beam inside a coverage zone of a sensor and a second array gain for the beam outside the coverage zone of the sensor, and
      transmit the signal via the beam at a transmit power based at least in part on the determined transmit power limit.

15. The apparatus of claim 14, wherein the first array gain is a first maximum gain among a first plurality of array gains at different positions of the beam inside the coverage zone, and wherein the second array gain is a second maximum gain among a second plurality of array gains at different positions of the beam outside the coverage zone.

16. The apparatus of claim 14, wherein to determine the transmit power limit, the processor is further configured to determine the transmit power limit based at least in part on a maximum distance of the coverage zone and a specified distance for a radio frequency (RF) exposure limit.

17. The apparatus of claim 14, wherein to determine the transmit power limit, the processor is further configured to determine the transmit power limit based at least in part on a minimum between a reciprocal of the first array gain times a first area and a reciprocal of the second array gain times a second area.

18. The apparatus of claim 17, wherein the first area is a first spherical surface area with a maximum distance of the coverage zone as a radius of the first spherical surface area, and wherein the second area is a second spherical surface area with a specified distance for a radio frequency (RF) exposure limit as a radius of the second spherical surface area.

19. The apparatus of claim 18, wherein the RF exposure limit is a time-averaged power density limit for mmWave frequency bands.

20. The apparatus of claim 14, wherein to transmit the signal, the processor is further configured to transmit the signal at the transmit power less than or equal to the transmit power limit.

21. An apparatus for wireless communication, comprising:
   a memory; and
   a processor coupled to the memory, the processor being configured to:
      select a beam for transmission of a signal;
      determine a transmit power limit based at least in part on a minimum between:
         a first ratio based on a maximum distance of a coverage zone of a sensor and a specified distance for a radio frequency (RF) exposure limit, and
         a second ratio based on a maximum array gain for the beam and an array gain for the beam outside the coverage zone; and
      transmit the signal via the beam at a transmit power based at least in part on the determined transmit power limit.

22. The apparatus of claim 21, wherein the first ratio is between a square of the maximum distance and a square of the specified distance, and wherein the second ratio is between the maximum array gain for the beam and the array gain for the beam outside the coverage zone.

23. The apparatus of claim 21, wherein the array gain for the beam outside the coverage zone is a maximum gain among a plurality of array gains at different positions of the beam outside the coverage zone.

24. The apparatus of claim 21, wherein the transmit power limit is for the selected beam and at the maximum distance of the coverage zone of the sensor, and wherein the transmit power limit is determined to be less than or equal to a product of the minimum and another transmit power limit at the specified distance for the RF exposure limit.

25. The apparatus of claim 21, wherein the RF exposure limit is a time-averaged power density limit for mmWave frequency bands.

26. The apparatus of claim 21, wherein to transmit the signal, the processor is further configured to transmit the signal at the transmit power less than or equal to the transmit power limit.

* * * * *